3,502,584
MAGNETIC COMPOSITE MATERIALS
Peter A. Denes, 5101 Crestwood Ave. NE.,
Albuquerque, N. Mex. 87112
No Drawing. Filed Mar. 31, 1966, Ser. No. 538,985
Int. Cl. H01f *1/09, 1/33;* H01p *1/36*
U.S. Cl. 252—62.55                                    2 Claims

ABSTRACT OF THE DISCLOSURE

A composite magnetic material utilizing magnetic ferrite material and metallic ferromagnetic material in particulate form in which the ferrite and ferromagnetic materials are admixed in a given manner so that each of the component materials is separately distinguishable in the composite material thereby allowing the composite material to have better overall characteristics than the individual component materials in such devices as switching cores and attenuators.

---

This invention relates to magnetic materials and, more particularly, to a composite magnetic material and a method of producing same.

The parameters of magnetic materials vary greatly and often conflicting values are desired for various applications. For example, magnetic materials selected for use as a permanent magnet require a high-saturation induction, high remanence and high coericivity. On the other hand, a magnetic material employed as a high-frequency magnetic core should have a high permeability (a parameter not unduly important in a permanent magnetic material), low coercivity and low losses. In some magnetic transducers, the most important parameters are a high-magnetostrictive coeffiicent, low high-frequency losses and good mechanical strength. For switching magnetic memory cores, very short switching time, a high-"squareness" ratio and high-saturation induction are the most important parameters. High-frequency magnetic attenuators generally require magnetic material that has a high lossiness, a high permeability and a high-dielectric constant. In the prior art, one or two of these properties could be achieved by a given material but other properties are compromised. To achieve these compromised properties, extensive and delicate processing has been required to develop the appropriate alloy or other material. In any event, the requirement of a material with different characteristics usually involved a new, extensive and costly development program.

The present invention contemplates a magnetic composite material of at least two distinguishable magnetic materials having distinctly different characteristics. The phrase "different characteristics" refers to materials either coming from two different classes of magnetic materials (e.g., a ferrite and an iron alloy or ferromagnetic material) or two materials having electrical or magnetic characteristics that differ substantially (e.g., 20 percent) from the other prior to forming the composite body or thereafter. In accordance with the present invention, these two types of magnetic materials are combined in particulate form and do not change substantially as individual particles in the composite body. By selecting and combining such magnetic materials in this manner and in appropriate proportions, magnetic and electrical parameters may be achieved which are tailored for the specific application and which are superior to the same parameters as possessed by the magnetic materials individually or the magnetic material available in the prior art.

It is, therefore, a desideratum of the present invention to provide a composite magnetic material possessing superior electrical and magnetic properties.

It is an object of the present invention to provide a composite magnetic material employing two distinctly different magnetic materials in particulate form.

It is an object of the present invention to provide a composite material employing a ferrite and ferromagnetic material in particulate form.

It is an object of the present invention to provide composite magnetic materials particularly useful for permanent magnets.

It is still another object of the present invention to provide composite magnetic materials particularly useful for magnetic switching cores.

A still further object of the present invention is to provide composite magnetic materials particularly useful for magnetic attenuators.

A still further object of the present invention is to provide composite magnetic materials particularly useful for magnetic transducers.

A still further object of the present invention is to provide composite magnetic materials particularly useful for high-frequency cores.

Yet another object of the present invention is to provide a process for combining such magnetic materials in a particulate form.

With these and other objects in mind, the present invention will now be described. The invention employs the mixture of two distinctly different magnetic materials, such as, ferromagnetic particles (e.g., iron and its alloys) and ferrimagnetic particles (e.g., ferrite). The particles of magnetic materials are mixed in such a manner that each of the materials will, after being processed and amalgamated, continue to possess the characteristics it had out of combination but, in addition, these individual characteristics are complemented by the other material's characteristics. Typically, the invention will involve the uniting of a ferromagnetic or a metallic material and a ceramic or ferrite magnetic material. The term "ferrite" as employed herein refers to all magnetic mixed oxides which contain iron as a major component. The ferrite particles may contribute the following properties to the composite body depending on their composition: very high or very low coercivity, medium saturation magnetization, high resistivity, and for many ferrite compositions tolerance of a wide range of processing atmosphere up to relatively high temperatures. The ferromagnetic materials contribute the following properties to the composite body: high permeability, high-saturation induction, mechanical strength and plasticity at relatively low temperatures. It should be understood that both the ferrites and the ferromagnetic materials may possess a broad range of characteristics and that in certain cases the property of the materials may be the reverse of that listed or a property of both materials may be the same. The following table lists typical values of such materials at 20° C.:

|  | Ferrites | | Ferromagnetic Materials | |
|---|---|---|---|---|
| Maximum saturation magnetization. | Mn Fe$_2$O$_4$ | 4,500 oersteds. | Hiperco, 65% Fe, 35% O. | 24,000 oersteds. |
| Coercive force. | Mn$_{0.65}$Zn$_{0.35}$, Fe$_2$O$_4$, Ba Fe$_{12}$O$_{19}$ | 0.2 oersteds. 2500 oersteds. | Permalloy Al Ni, Co-steels Pt-Co. | 0.3 oersteds. 500-700 oersteds. 3,500 oersteds. |
| Maximum relative initial permeability. | Ni$_0$Zn$_{0.7}$, Fe$_2$O$_4$ | 4,000 | Supermalloy. | 100,000 |
| Resistivity | FeO Fe$_2$O$_3$, NiFe$_{1.9}$Mn$_{0.02}$O$_{3.87}$ | 10$^{-2}$ ohm-cm 10$^{10}$ ohm-cm | Fe Alloys. | 10$^{-5}$ ohm-cm. 10$^{-4}$ohm-cm. |

Examples of ferromagnetic materials which may be employed in accordance with the present invention include: iron, iron-nickel alloys, iron-cobalt alloys; the latter two may include as additives to the alloys molybdenum, chromium, vanadium and copper. Still other ferromagnetic materials which may be used are iron-aluminum, iron-aluminum-silicon, iron-silicon alloys and the like.

Examples of ferrites which may be employed in accordance with the present invention are such mixed ferrites as: nickel-zinc, manganese-zinc and manganese-magnesium, each of which may include additives such as cobalt oxide, vanadium oxide and copper oxide.

The identity of the undivided particles should be discoverable in the final solid composite magnetic body by a light or at least an electron microscope while being of a size sufficient to retain their magnetic domains. The minimum size of the particulate materials is such that these particles retain magnetic domains. It has been determined that the range of sizes of such particles typically falls between 0.01 micron and 10 millimeters.

It is generally desired to employ a process for combining the particulate materials without producing "unwanted" chemical change or reactions between them. "Unwanted chemical change or reactions" as employed in this description is intended to mean that changes in the magnetic or electrical properties of the materials do not occur at all or do not occur to an extent that such materials in the composite body no longer possess their initial magnetic and electrical properties to a substantial degree. In general, the term "substantial degree" as employed herein refers to an adverse change of more than 20 percent in a significant magnetic or electrical property.

In the presently preferred process, the particulate magnetic materials are thoroughly admixed and then bonded, employing a pressure heating step wherein the maximum temperatures and time of such step are sufficiently low as to preclude any unwanted chemical change or reactions. Pressure heating involves the application of pressure and heat in various sequences or in combination to form a composite body. In addition, the pressure heating is preferably carried out in an atmosphere that avoids or at least minimizes chemical changes or reactions. Most ferromagnetic materials are metallic; therefore, they would tend to oxidize in an oxidizing atmosphere. The degree of oxidation depends upon the temperature, the time and the material used. Oxidation to a certain degree might not be detrimental to all such materials depending upon the ultimately desired magnetic properties of the composite magnetic material. Some ferrite materials may be prepared or perfected in an oxidizing, neutral or even a reducing atmosphere. The latter atmosphere is sometimes desired in order to maximize lossiness. The selected atmosphere to be employed in forming the composite magnetic material is generally determined as a compromise depending upon the particular materials employed and the desired or allowable chemical changes in the magnetic materials sought or tolerable. As will be apparent from specific examples hereafter set forth, the atmosphere may be vacuum, reducing, slightly reducing, neutral, oxidizing or slightly oxidizing. In general, the pressure heating takes place at temperatures below approximately 1200° C. and pressures in excess of 20,000 p.s.i.

With regard to forming the composite body, "pressure heating" is particularly advantageous in that it increases the density of the particles in the composite body. The density of the magnetic particles in the composite solid body may also affect magnetic properties. Generally, the greater the density, the more fully will be realized the magnetic properties of the constituent particle. "Pressure heating" as used herein means the heating of the particles under pressure to a degree such that the particles which are of a metallic nature will become sufficiently ductile to fill up voids and to form a bond and yet unwanted chemical reactions and changes will not occur or will be minimized. The particular manner in which this is accomplished will be understood from the examples appearing later in this description. It is preferred, although not necessarily required, that one of the ferromagnetic materials become ductile at a relatively low temperature. Thus, when the ferromagnetic and other materials are bonded, a stronger bond would occur and voids between the particles will be filled up by the plastic deformation. This also facilitates the combining of the materials at lower temperatures that tends to minimize unwanted chemical changes or reaction. In this regard, ferromagnetic alloys containing high portions of nickle and cobalt are particularly useful. In general, it is preferred that no substantial amount of additional bonding material be added to the magnetic materials. In this regard, it is preferred that the composite body have less than 8 percent by volume of a non-magnetic constituent (i.e., binder or otherwise) in fine distribution. More specifically, it is preferred that approximately no more than 3 percent by volume of bonding material be added to soft composite magnetic systems (e.g., transducers magnetic materials) and no more than 20 percent by volume be added to permanent composite magnetic systems (e.g., permanent magnetic materials).

It should be understood that it is within the scope of the invention to employ exclusively pressure or exclusively heat to form the composite body without the "unwanted chemical changes or reactions." This use of heat alone is appropriate in instances where the particular constituents are insensitive to high temperatures (e.g., see example 4 which appears later in the specification). Such a method may involve sintering without pressure at 1300° C. with heating, soaking and cooling taking place in a nitrogen atmosphere. The use of pressure alone involves some high-pressure technique such as explosive compacting or hydraulic pressing. Other methods which are within the scope of the invention involve repeated cold pressing and annealing or sintering.

With the above description of the general aspect of the invention in mind, the particular electrical and magnetic characteristics required for various applications will now be considered. The permeability and the saturation induction are two characteristics which are important to high-frequency inductors or cores. If one material is a ferromagnetic material having a saturation induction $B_{s1}$ and the other material is a ferrite having a saturation induction $B_{s2}$, the composite will have a saturation induction $B_{sc}$ which is approximately equal to $V_1 B_{s1} + V_2 B_{s2}$: where $V_1$ and $V_2$ are the volume parts of the ferromagnetic and ferrite materials, respectively, and where $V_1+V_2=1$.

The permeability $\mu$ of the composite material in a given direction is structure dependent. If $V_1$ and $V_2$ do not differ substantially from one another and the distribution of the grains of both the ferrite and ferromagnetic materials are fine and uniform, it follows that $\mu_3=\mu_1 V_1+\mu_2 V_2$: where $\mu_1$ and $\mu_2$ are the permeabilities of the ferromagnetic material and the ferrite material, respectively. Examples of such composite materials are as follows:

EXAMPLE 1

The ferromagnetic composition employed is an alloyed powder consisting of 80 percent by weight nickel and 20 percent by weight iron. The average particle size of the ferromagnetic nickel-iron powder is 3 microns. The ferrite powder has an average particle size of 1 micron. The ferrite composition is 51 mol percent $Fe_2O_3$, 37 mol percent MnO and 12 mol percent ZnO completely reacted. Fifty percent by weight of the ferromagnetic material was mixed thoroughly with 50 percent by weight of the manganese-zinc ferrite, in a water suspension employing no binder. The powder is then filtered, dried, repulverized, granulated and afterward it is placed in a heatable die to perform the pressure heating and form a toroidal shape. The die is maintained in a vacuum-tight enclosure and heated to 600° C. A pressure of 30,000 p.s.i. is applied pressing the toroid to approximately 98 percent of its theoretical maximum density. Then, the vacuum is released and the chamber filled with pure nitrogen; the die is heated to 800° C. and again a pressure of 30,000 p.s.i. is applied. The theoretical density of the toroid is 99.9 percent after the second pressure step. The incremental increase of the density is achieved by the higher ductility of the alloy particles at the higher temperature. The two-step processing as explained above serves to remove the air from the die in the initial step and to avoid reduction of the manganese-zinc ferrite which would occur if it were to be exposed to 800° C. in vacuum. After the second pressing, the toroid is tempered in nitrogen by slowly cooling it at a rate of 10° C. per minute to 650° C. and from 650° C. down to 150° C. at 5° C. per minute. A toroid manufactured in accordance with the above possesses a maximum permeability of more than 15,000, a saturation induction of 7,000 gauss and a volume resistivity of more than $10^4$ ohm.cm.

EXAMPLE 2

A high-frequency core manufactured as follows: A 60 percent ferromagnetic alloy composition of 85 percent by weight of iron, 5 percent by weight of aluminum and 10 percent by weight of silicon is mixed in a fine distribution having an average particle size of 3 microns. It is mixed with 40 percent completely reacted nickel-zinc ferrite of the composition of 50 mol percent $Fe_2O_3$, 5.5 mol percent Ni, 23.5 mol percent ZnO, 16 mol percent MgO and 5 mol percent CuO. The average particle size of ferrite material is 1 micron. The pressing is achieved in air at 750° C. at a pressure of 35,000 p.s.i. The resulting important properties are: permeability, more than 10,000; saturation induction, 6,200 gauss; and resistivity, $10^3$ ohm-cm.

In a permanent magnet, on the other hand, the coercivity, remanence and B–H product should be maximized. This can be accomplished by selecting a first material (e.g., ferrite) having a very high coercivity and a second material (e.g., ferromagnetic) having a very high-saturation induction which is related remanence. If the permanent magnet is magnetized and the magnetic vectors of all of the grains are aligned parallel in one direction, the remanence $B_r$ can be shown to be approximately equal to $V_1 B_{r1}+V_2 B_{s2}$: where $V_1$ and $V_2$ are the volumes of the first material and second material, respectively, and $B_{r1}$ is the remanence of the first material and $B_{s2}$ is the saturation induction of the second material. The second material tends to become saturated by the very strong permanent magnetic field of the first material. The resulting remanence of the composite material may be substantially larger than that of the material made of only the second material because the second magnetic material is magnetically completely saturated. The volume ratio of the second material is limited by the requirement that no closed magnetic lines may be developed which would decrease the remanence. This limit is dependent on the pertinent properties of the two magnetic materials and lies between approximately 10–50 percent by volume of the second material. The coercivity of the composite material $H_c$ will have a value smaller than $H_c 1$ (the coercivity of the first material). When a demagnetizing field surpasses $H_c 2$ (the coercivity of the second material), which can be quite small, the magnetic vectors of the second material still do not change direction because the strong fields of the first material still overcome the demagnetizing fields. Calculation of $H_c$ is not simple but is a rather complex matter as the grains may be irregular and at high demagnetizing fields internal leakage occurs through some domains of the materials. The increase of the B–H product of the composite permanent magnetic materials can be very large by employing certain combinations of ferromagnetic and ferrite materials. The following are examples of permanent magnetic materials:

EXAMPLE 3

A permanent magnetic material of the composition 87 percent by weight silver, 9 percent by weight manganese and 4 percent by weight aluminum (ductile at room temperature, high intrinsic coercivity such as 6,000 oersteds and low remanence such as 550 gauss) is mixed in a weight ratio of 80:20 percent by volume with a powdered ferromagnetic alloy of the composition of 50 percent by weight iron and 50 percent by weight cobalt which has a saturation induction of 24,500 gauss and a coercivity of 2 oersteds. The powders are compressed in a die at 500° C. temperature and 25,000 p.s.i. pressure. This results in a composite body having 250 oersteds coercivity, 5,000 gauss remanence and 6,000 gauss saturation induction.

For switching magnetic memory core materials, it is desirable to have a very short switching time and a high squareness ratio. For purposes of this discussion "squareness ratio" is defined as the ratio of the remanence to the saturation induction. The two main groups of materials primarily used in the present art as switching materials are metallic magnetic thin sheets and ferrite toroids or sheets. Ferromagnetic metallic systems have a very short switching time but they can only be used in thin layers; because when made as powder cores, their permeability is low and, hence, their squareness ratio is too low to be satisfactory. Ferrite memory cores which are used in toroid and thin-film shapes have a 0.1 to 10 microsecond switching time and a 0.8 to 0.98 squareness ratio, dependent on their composition and size. The ability to form ferrites into a toroid provides better signal-to-noise ratios as the switched area is well defined by the volume of the toroid and there is substantial isolation from adjacent elements. In thin-film metallic memories, the switched area would be completely defined and isolated only if the squareness ratio is 100 percent. Such a squareness ratio is not practically realized. The switching time of ferrites decreases if the volume of the cores or the thickness of the memory plane decreases and at the same time the squareness ratio improves. The volume to which the ferrite core can be reduced is limited by technological problems.

Uniting ferrites and ferromagnetic materials in switching cores results in cores having a high squareness ratio and other favorable properties. A system employing ferrite and ferromagnetic materials switches as fast as the ferromagnetic particles, provided the materials are properly selected. This phenomenon is attributable to the ferromagnetic materials switching when the applied field reaches the value of the coercivity of ferromagnetic material in the opposite direction. The switching of the ferromagnetic material produces a very large remanence that almost instantly switches the ferrite. This switching of the composite body as controlled by the switching time of the ferromagnetic materials is only true so long as the coercivity of the ferrite is larger than that of the ferromagnetic material. If the opposite is the case, the switching time of the ferrite particles determines the switching time of the entire composite core. It is, therefore, advantageous that the coercivity of the ferrite particles be greater than the coercivity of the ferromagnetic particles. The present composite memory material results in still further advantages in that the saturation induction is higher than that of the ferrites and, hence, the output voltage is higher and in that it has a higher permeability than ferrites, thus improving the squareness ratio. The presence of ferrite particles in very small individual volumes results in a further improvement in the switching time and squareness ratio. A typical example of switching cores formed in accordance with the invention are as follows:

EXAMPLE 4

A composite switching memory core is formed from 65 percent by weight ferromagnetic metal alloy powder and 35 percent by weight ferrite powder. The composition of the metal alloy powder is 50 percent by weight iron and 50 percent by weight nickel. The composition of the ferrite is 46 mol percent $Fe_2O_3$, 50 mol percent MnO, 2 mol percent MgO and 2 mol percent $Li_3O$. The powders are mixed very thoroughly and pressed in air at 500° C. temperature and 30,000 p.s.i. pressure.

Other ferrites which may be employed in the above examples are 40 mol percent $Fe_2O_3$, 40 mol percent MgO and 20 mol percent MnO. Other ferromagnetic materials which may be employed are 49 percent Fe, 49 percent Ni and 2 percent Mo. These materials may be combined in proportions such that the ferrite has a range of 20 percent to 50 percent by weight and the ferromagnetic material has a range of 80 percent to 50 percent by weight.

It is desirable for magnetic materials of high-frequency attenuators to have the following properties: high permeability, high dielectric coefficient and lossiness. The importance of these properties is made clear by the expression for attenuation of a material which has both magnetic and dielectric properties, wherein:

$$A = 128 \times 10^{-11} f \sqrt{K\mu} \sqrt{\frac{1-\cos(\partial_K + \partial_\mu)}{\cos \partial_K \cos \partial_\mu}}$$

where:

A = attenuation in db per centimeter lengths
f = frequency in cycles per second
$\mu$ = permeability
$\partial_\mu$ = magnetic loss tangent
K = dielectric constant
$\partial_K$ = dielectric loss tangent Ferromagnetic powder cores and ferrite cores have been heretofore used for such purposes. Powder cores give good attenuation above 50 megacycles per second and ferrites above 5 megacycles per second. Ferrites also have the advantage of insuring higher DC insulation resistance between the central terminal and ground of a high-frequency attenuator device.

From the above equation, it may been that to obtain a high attenuation at a predetermined frequency, permeability and the dielectric constant should be high, but much more important, the material should be as lossy as possible. The lossiness of the material is related to the tangents $\partial_\mu$ and $\partial_K$ which, in turn, is related to particle size. If the $\partial_\mu$ and $\partial_K$ equal zero, the attenuation would also be zero. If any of the angles (e.g., $\cos \partial_K$ or $\cos \partial_\mu$) approach $\pi/2$, the attenuation becomes extremly high. The value of the tangents may be optimized by selecting as large a particle size as practical and consistent with other requirements. For example, an average particle size ranging from 2 to 10 microns is suggested for high attenuators. Thus, by employing a composite body of ferrite and ferromagnetic particles of an appropriate size, the permeability, dielectric constant and tangent losses may be substantially improved. For example, an attenuator with very high attenuation at low-frequencies, such as 0.1 megacycles, is possible. Examples of attenuators made in accordance with this invention are as follows:

EXAMPLE 5

A composite material composed of 60 percent by weight of a ferromagnetic alloy and 40 percent by weight of a ferrite. The ferromagnetic alloy contains 65 percent nickel and 35 percent iron. The ferrite has the following composition: 50 percent $Fe_2O_3$, 24 percent NiO, 1 percent CoO, 24 percent ZnO and 1 percent MgO—all in mol percentages. The particle size of the ferromagnetic alloy is limited between 10 and 20 microns, to have high eddy current losses. The average particle size of the ferrite is 3 microns. The composite material is pressed in air atmosphere at 850° C. temperature and 24,000 p.s.i. pressure. The attenuation obtained is 20 db per centimeter.

EXAMPLE 6

Anoher example of composite material for attenuators is one in which the ferrite is slightly reduced to increase its lossiness. The ratio of the ferromagnetic and ferrite materials is 1:1 by weight. Composition of the ferromagnetic constituent is 72 percent nickel, 14 percent copper, 2 percent molybdenum and 12 percent iron, all weight percentages. The composition of the ferrite is 53 percent $Fe_2O_3$, 11 percent ZnO, 35 percent MnO, 1 percent MgO—all mol percentages. The pressing occurs at 500° C. in vacuo, applying a pressure of 35,000 p.s.i. The resulting attenuation of the materials is 25 db per centimeter.

EXAMPLE 7

The final example of a composite material application is as a magnetic transducer such as employed for sensing pressure, stress or other physical effects. In magnetic transducers two important properties are sought: high magnetostrictive coefficient and high-frequency response. Some metallic alloys, e.g., iron-cobalt, have the largest magnetostrictive coefficients among known magnetic materials and could be the most effective magnetic transducers. However, the large eddy current losses at higher frequencies diminish their efficiency. When such alloys are made in powder form and combined with an insulating ferrite material, the eddy current losses are greatly reduced. By employing a ferrite material that has a good magnetostrictive coefficient, a composite material having a very high magnetostrictive coefficient with a very high-frequency limit is provided. Further, this combination overcomes another weak property of ferrite transducers: their brittleness. If a ferrite transducer has a large magnetostrictive coefficient, the sudden change in dimension exerts such a stress on the ferrite material that it can easily fracture due to its fragility. Opposite to this, the composite material has metallic matrix which is ductile and takes up the stresses so that the powdery ferrite particles do not crack.

EXAMPLE 8

An example for a composite magnetic transducer is the following: Alloyed powder composed of 50 percent iron and 50 percent by weight cobalt is mixed with nickel ferrite ($NiFe_2O_4$) in a ratio of 75 percent metallic and 25 percent by weight ferrite particles. The mixture is molded at 30,000 p.s.i. and at 800° C. A very dense and mechanically strong transducer body results which can handle the large mechanical stresses generated by the large changes in dimensions if subjected to a magnetic field. The frequency limit of the material is $10^5$ cycles per second, while the magnetostrictive coefficient is $10.10^{-6}$ per oersted field strength.

Other examples of the invention may involve the use of a metallic binder, the use of two metallic particles having distinctly different characteristics, the use of coated particles or the use of magnetic particle orientation during processing. Examples using such alternatives are as follows:

EXAMPLE 9

This example describes the use of a metallic binder between two constituent particles, the use of coated particles and the use of aligning fields during processing. One of the constituent particles is barium ferrite, $BaFe_{12}O_{19}$ of an average particle size of 2 microns. The barium ferrite particles are first plated by a 0.05 micron thin iron layer, using an electroless bath of the following composition: 35 grams ferrous sulfate, 50 grams Rochelle salt and 12 grams sodium hypophosphite in one liter water. Then both the iron plated barium ferrite particles and 3 micron size alloy particles of the composition of 51 percent by weight iron, 24 percent by weight cobalt, 14 percent by weight nickel, 8 percent by weight aluminum and 3 percent by weight copper are coated with a 0.1 micron thick tin layer, using an immersion plating bath of the composition of 5 grams tin chloride and 100 grams of potassium hydrogen tartrate $KHC_4H_4O_6$ in one liter water at boiling temperature. The following finely distributed mixture is prepared with the plated powders: 30 percent by volume barium ferrite, 40 percent by volume ferromagnetic alloy and 30 percent by volume 1 micron average particle size tin. Then the mixture is pressed at 160° C. with a pressure of 30,000 p.s.i. Before the pressing, a strong magnetic field is applied in a preferred direction which aligns the spontaneous domain directions of the magnetic particles in the preferred direction. The following table shows the coercivity and remanence of the constituents and of the composite material in the preferred direction:

|  | Remanence, gauss | Coercivity, $O_e$ |
| --- | --- | --- |
| Barium ferrite | 3,800 | 2,600 |
| Ferromagnetic alloy | 13,000 | 640 |
| Composite material | 5,500 | 1,500 |

EXAMPLE 10

In this example, one of the used constituents is manganese bismuthide. MnBi has the highest known intrinsic coercivity—as high as 20,000 oersteds if the particles are fine and aligned in a magnetic field. The remanence is reltively low, 6,000 gauss, and the material is brittle. There is 30 percent by weight of this powder coated with a thin tin layer with 70 percent by weight of a ductile alloy consisting of 34 percent by weight iron, 52 percent by weight cobalt and 14 percent by weight vanadium, having a coercivity of 500 oersteds, a remanence of 10,000 gauss and a saturation induction of more than 20,000 gauss. The latter alloy is also coated with a thin tin layer to increase the adherence of the particles of the mixture to each other after pressing them at 200° C. and 10,000 p.s.i. Before the pressure, the particles are magnetically oriented. The composite material has a remanence of 13,000 gauss in the oriented direction and the material is not brittle.

From the examples included above, it should be appreciated that it is preferred that preparation of the composite body take place at temperatures below 1,200° C. and pressures above 20,000 p.s.i. The invented process may include various stages of heating and pressing as well as various plating and magnetic orientation steps. There are many types of magnetic materials that may be employed consistent with the invention but the essential broad aspect of the invention is a composite magnetic material in which the components substantially maintain their original properties and the overall properties of the composite material are better than the overall properties of any of the components alone.

What is claimed is:
1. An attenuator having a composite solid body of magnetic material consisting essentially of:
    40 to 60% by weight magnetic ferrite material in particular form; and
    60 to 40% by weight metallic ferromagnetic material in particulate form; said ferrite and metallic ferromagnetic materials being admixed so that each of said materials is separately distinguishable and said composite material has high magnetic high dielectric loss factors and a high dielectric constant; said magnetic and dielectric loss factors having been determined primarily by particle sizes of said ferrite and metallic ferromagnetic materials, said particles having an average size of about 2 to 10 microns.
2. The attenuator defined in claim 1 including less than 20% of a nonmagnetic binding material.

References Cited

UNITED STATES PATENTS

| | | | |
| --- | --- | --- | --- |
| 3,073,728 | 1/1963 | Falk | 252—62.55 |
| 3,100,167 | 8/1963 | Falk et al. | 252—62.55 |
| 1,721,379 | 7/1929 | Ehlers et al. | 252—62.55 |
| 2,575,099 | 11/1951 | Crowley | 252—62.55 |
| 3,019,103 | 1/1962 | Alexander | 75—212 |

FOREIGN PATENTS

| | | |
| --- | --- | --- |
| 805,710 | 12/1958 | Great Britain. |
| 984,544 | 2/1951 | France. |
| 1,037,351 | 8/1958 | Germany. |

HELEN M. McCARTHY, Primary Examiner

R. D. EDMONDS, Assistant Examiner

U.S. Cl. X.R.

333—81